INVENTOR.
GEORGE K. FARNEY
BY Harry E. Aine
ATTORNEY

DISCHARGE DEVICE SLOW WAVE CIRCUIT WHEREIN THE BEAM ALTERNATELY INTERACTS WITH THE SERIES AND SHUNT VOLTAGE FIELDS OF THE SLOW WAVE STRUCTURE

Original Filed March 9, 1964

INVENTOR
GEORGE K. FARNEY
BY Harry E. Aine
ATTORNEY

DISCHARGE DEVICE SLOW WAVE CIRCUIT WHEREIN THE BEAM ALTERNATELY INTERACTS WITH THE SERIES AND SHUNT VOLTAGE FIELDS OF THE SLOW WAVE STRUCTURE
Original Filed March 9, 1964

INVENTOR.
GEORGE K. FARNEY
BY
ATTORNEY

INVENTOR.
GEORGE K. FARNEY

BY Harry E. Aine

ATTORNEY

INVENTOR.
GEORGE K. FARNEY
BY
[signature]
ATTORNEY

INVENTOR.
GEORGE K. FARNEY

BY Harry E. Aine

ATTORNEY 3,358,179
DISCHARGE DEVICE SLOW WAVE CIRCUIT WHEREIN THE BEAM ALTERNATELY INTERACTS WITH THE SERIES AND SHUNT VOLTAGE FIELDS OF THE SLOW WAVE STRUCTURE

George K. Farney, New Providence, N.J., assignor to S-F-D Laboratories, Inc., Union, N.J., a corporation of New Jersey
Continuation of application Ser. No. 350,504, Mar. 9, 1964. This application May 8, 1967, Ser. No. 637,007
18 Claims. (Cl. 315—3.5)

This application is a continuation application of 350,504 filed Mar. 9, 1964, now abandoned.

The present invention relates in general to slow wave circuits and to discharge devices employing same and, more particularly, to novel slow wave circuits derived from two wire transmission lines by geometrical meandering and/or reactive loading for electronic interaction in microwave tubes. Such novel circuits provide microwave tubes having one or more improved characteristics such as increased bandwidth, efficiency, power output, and tunability and are useful, for example, in many applications such as radar, radio astronomy, communications and the like.

Heretofore, several different well known microwave slow wave circuits have been developed which are derived from two wire transmission lines by geometrical meandering and/or reactive loading. Examples of such prior art circuits include meander lines, bifilar helices, interdigital lines, ridge loaded ladder lines, quarter wave vane or cavity resonators over a ground plane, and inductively or capacitively strapped bar circuits.

The aforementioned two wire transmission line derived slow wave circuits can be represented by equivalent cir cuit representations made up of iterated sections of equivalent T filter circuits made up of series and shunt elements. Each T section is capable of presenting either or both series and shunt element voltages to a beam passing therethrough depending upon the choice of geometrical meandering and/or reactive loading.

All prior two wire derived circuits have utilized synchronous interaction between the beam and only one of the two element voltages, i.e., either series or shunt voltages.

In the present invention two wire derived slow wave wave circuits are provided which obtain synchronous electronic interaction with both the series and shunt voltages of the circuit. This two voltage type interaction is advantageous because it increases the electronic interaction or impedance between the beam and the circuit permitting greatly increased power output, bandwidth, and efficiency as compared with prior single votlage interaction circuits. In addition, the novel two voltage interaction gives the tube designer greater latitude in controlling the dispersion characteristics of the slow wave circuit. The low frequency characteristic can be made dependent upon one of the T section elements (series or shunt element) while the high frequency characteristic can be made dependent upon the other T section element. Judicious choice of these T section elements leads to tubes having greatly increased bandwidth.

The principal object of the present invention is to provide improved slow wave circuits and discharge devices employing same.

One feature of the persent invention is the provision of a novel slow wave circuit for synchronous electronic interaction with a stream of charged particles wherein the circuit is derived from a two wire transmission line by geometrical meandering and/or reactive loading and develops electronic interaction between both the series and shunt voltages of the circuit and the stream of charged particles whereby electronic interaction is enhanced.

Another feature of the present invention is the same as the first feature wherein the slow wave circuit is an alternating series/and shunt electronic interaction circuit.

Another feature of the present invention is the same as the first feature wherein the slow wave circuit is formed by a two wire line meandering back and forth across the stream of charged particles.

Another feature of the present invention is the same as the first feature wherein the slow wave circuit is formed by interdigitated conductive fingers, the fingers being bifurcated to provide series reactive loading and to develop a series voltage for electronic interaction with the stream of charged particles.

Another feature of the present invention is the same as the immediately preceding feature wherein the bifurcated fingers are ring shaped and coaxially aligned for electronic interaction with a stream of charged particles passing coaxially thereof.

Another feature of the present invention is the same as the next to the last preceding feature wherein the conductive fingers are vanes.

Another feature of the present invention is the same as the first feature wherein the slow wave circuit is formed by an array of bars transversely directed of the stream of charged particles and strapped together in a certain way by a two wire line.

Another feature of the present invention is the same as the first feature wherein the slow wave circuit is formed by an array of alternate long and short slots disposed transverse to the stream of charged particles and strapped together by a two wire line directed along the stream path.

Another feature of the present invention is the same as the next preceding feature wherein the slots are formed in the wall of a cylinder for interaction with a cylindrical stream of charged particles.

Other features and advantages of the present invention will become apparent upon a perusal of the specification and accompanying drawings wherein.

Figure 3:
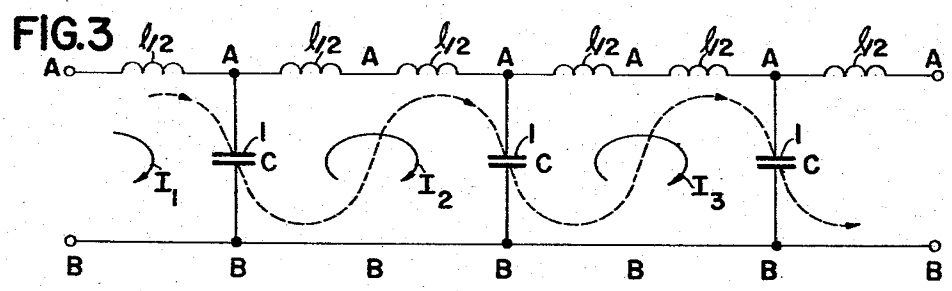
Figures 4A, 4B:
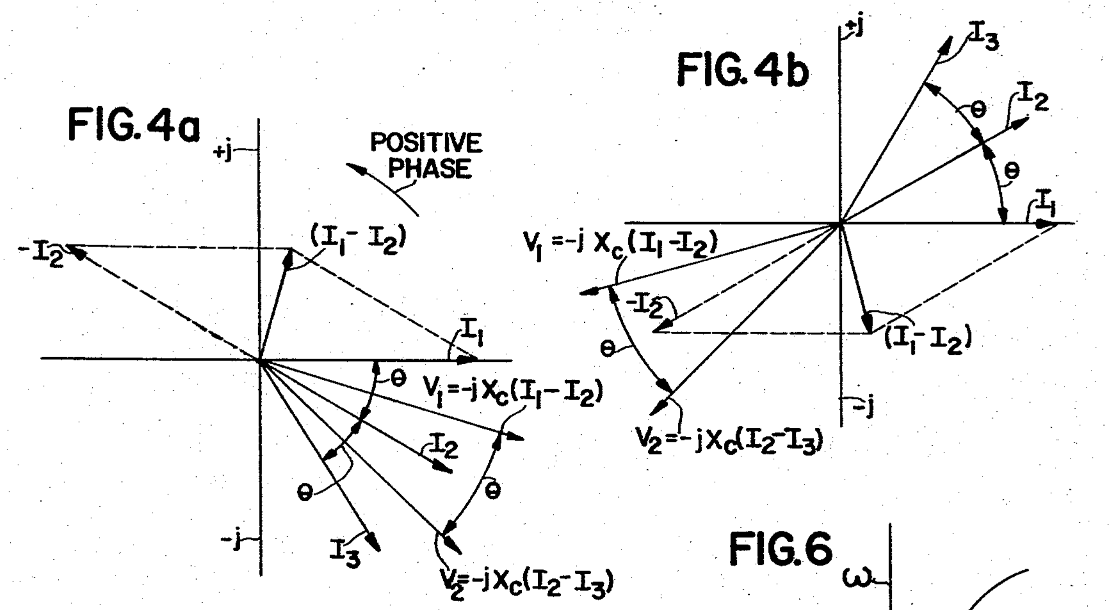
Figure 5:
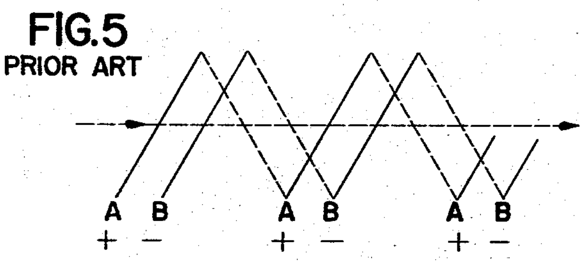
FIG. 5 PRIOR ART
Figure 6:
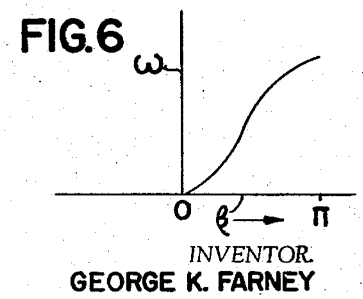
Figure 7:
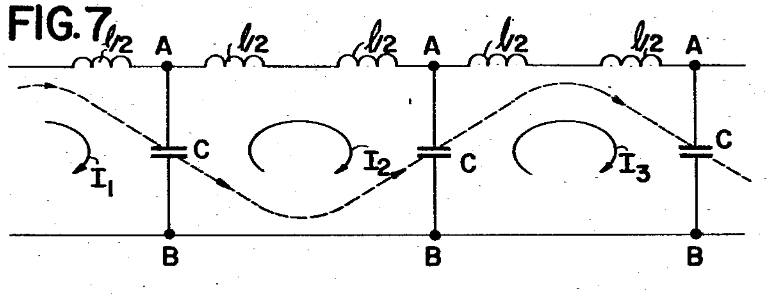
Figures 8, 9, 10, 11:
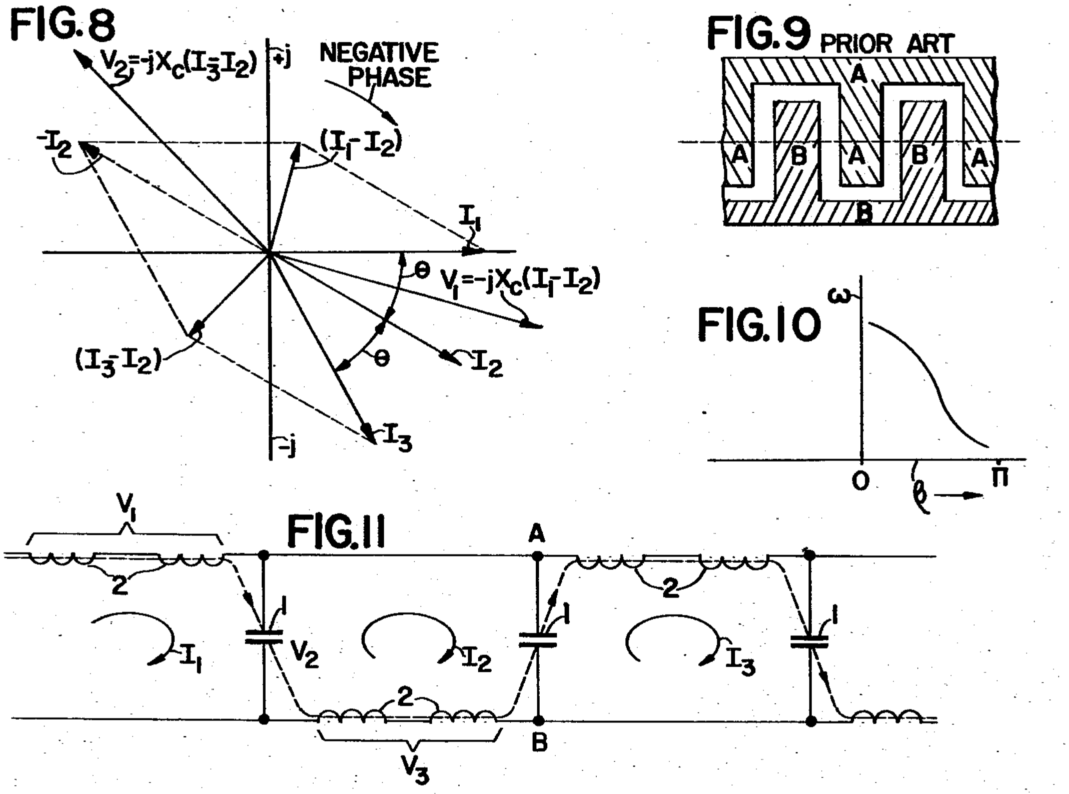
Figures 12, 13:
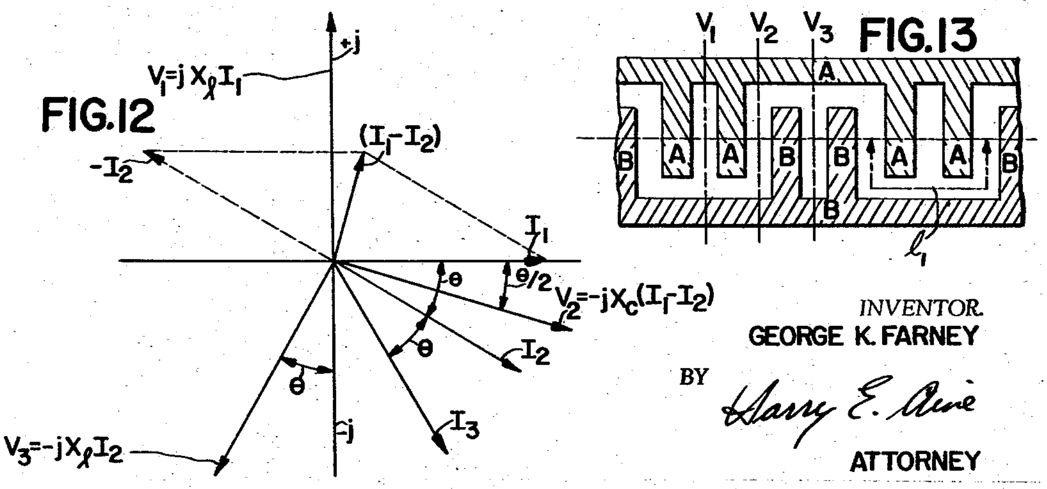
Figure 14:
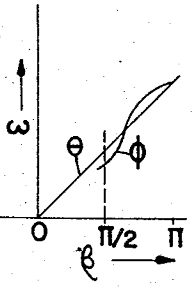
Figure 15:
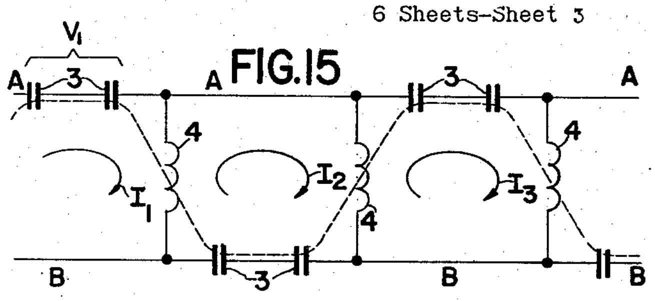
Figures 16, 17, 18:
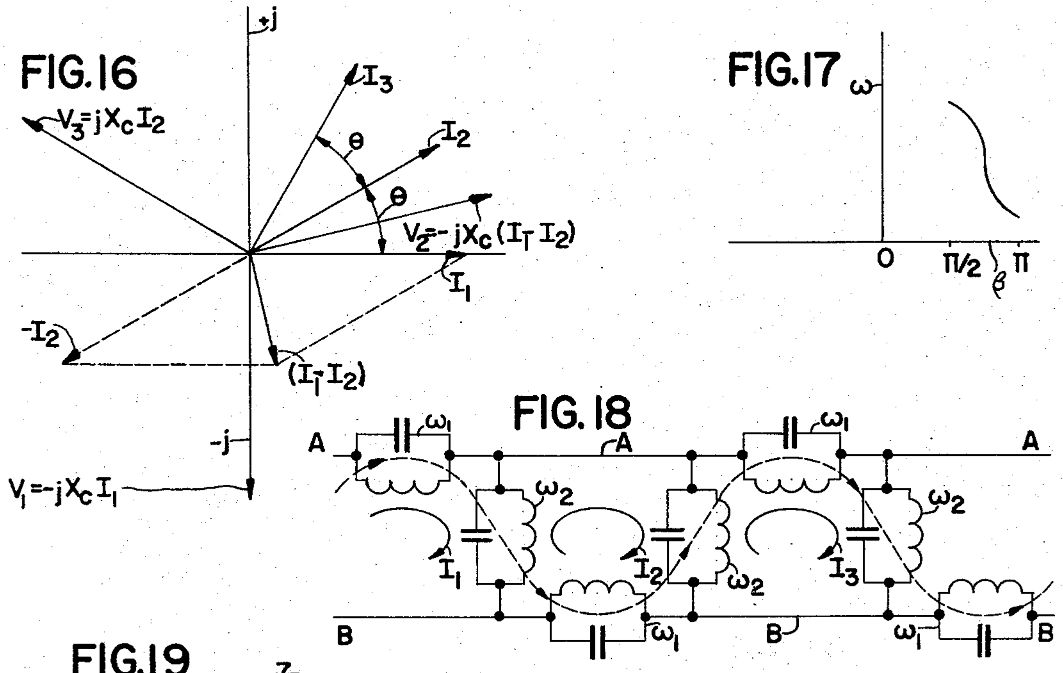
Figure 19:
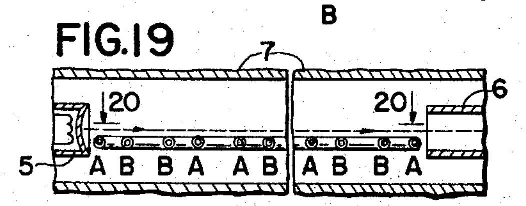
Figure 20:
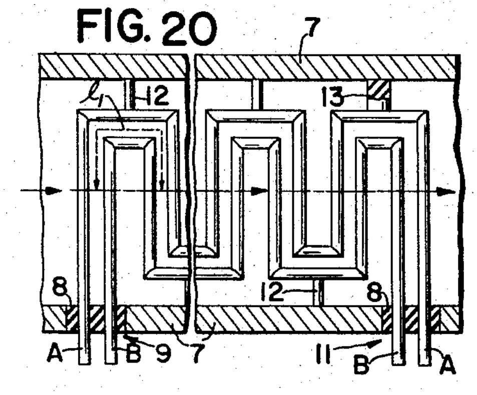
Figure 21:
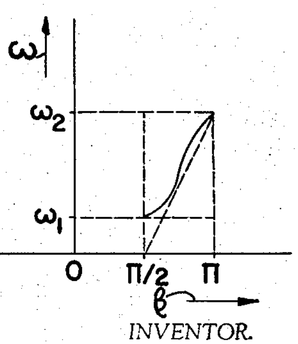
Figure 22:
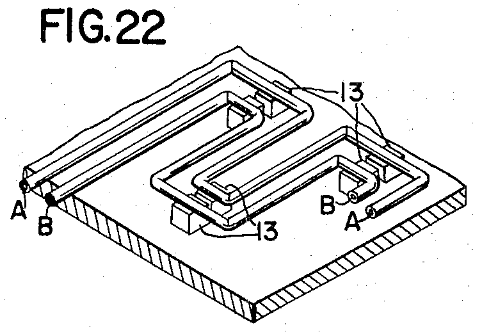
Figure 23:
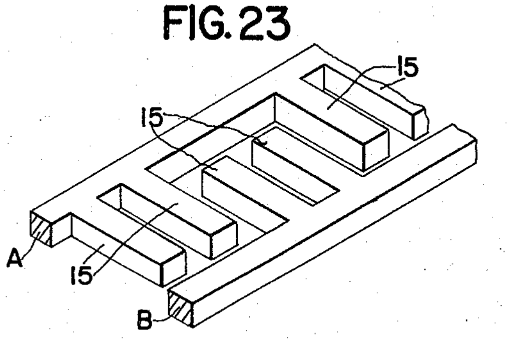
Figure 24A:
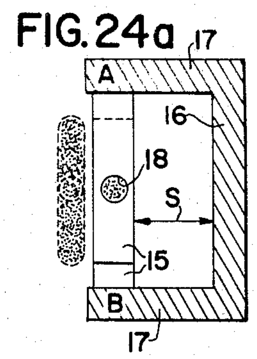
Figure 24B:
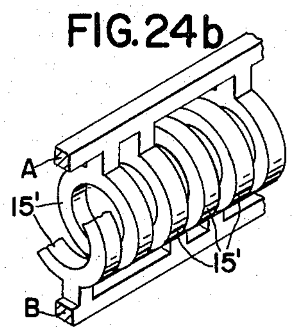
Figure 25:
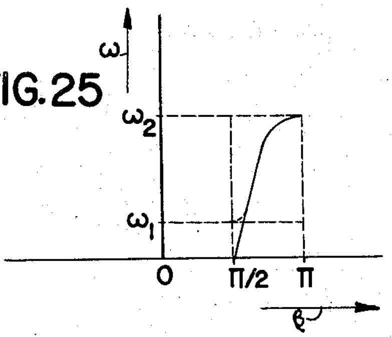
Figure 26:
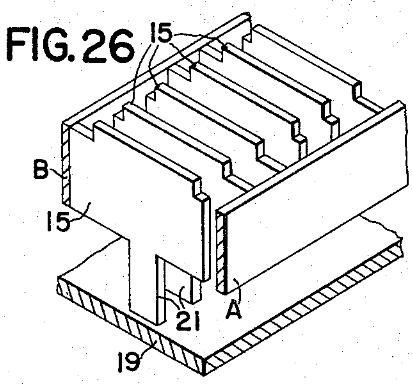
Figure 27:
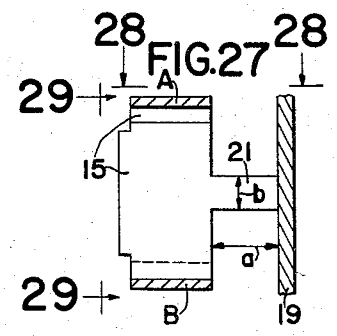
Figure 28A:
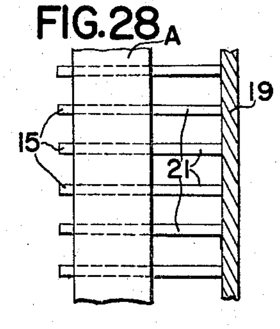
Figure 30:
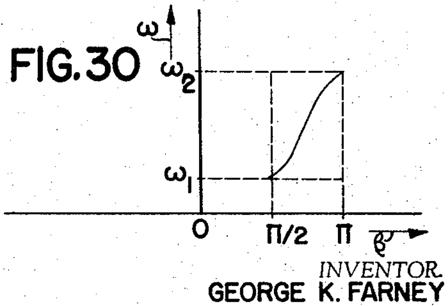
Figure 29:
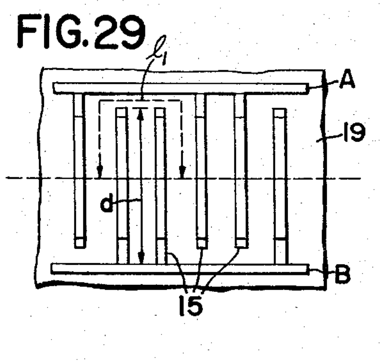
Figure 31:
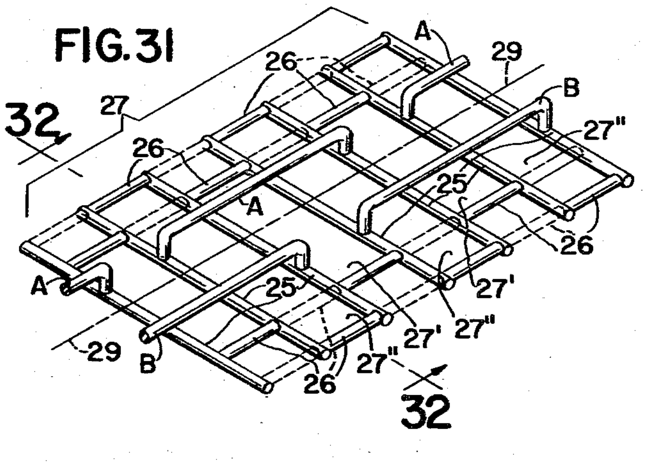
Figure 33:
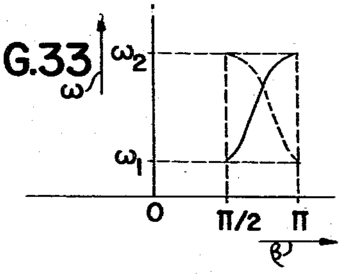
Figure 32:
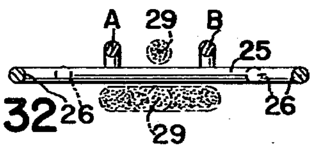
Figure 34:
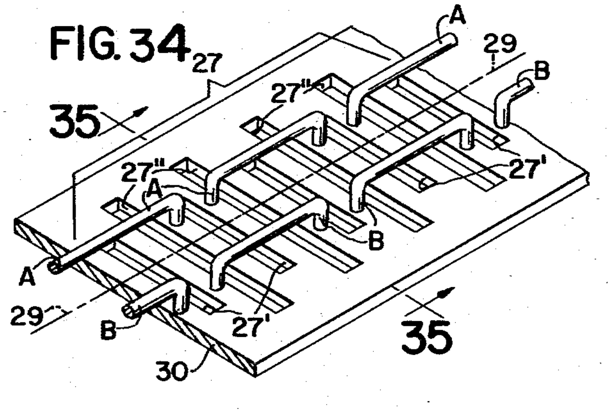
Figures 35, 36:
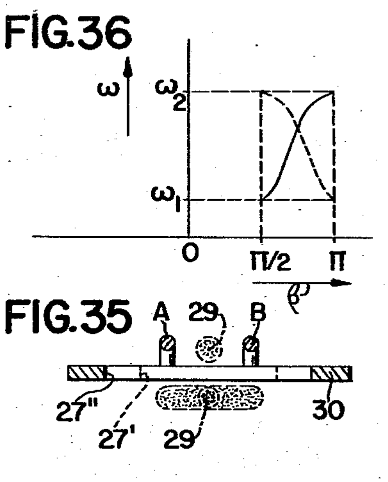
Figure 37:
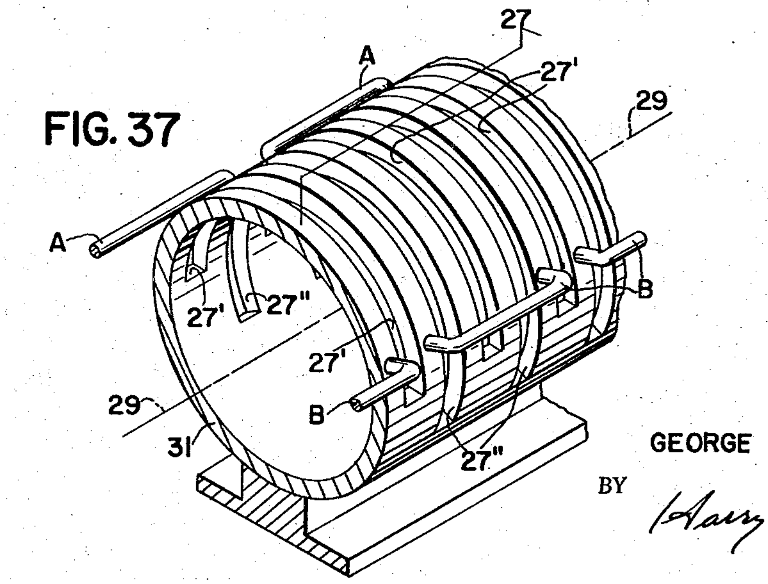
Figure 38:
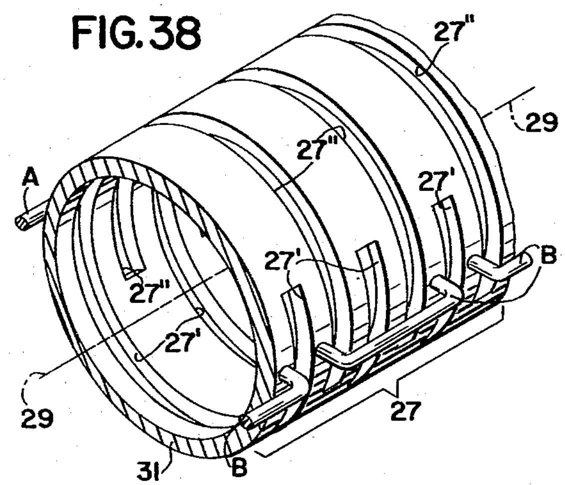
Figure 39:
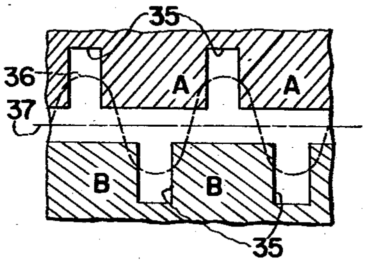
Figure 40:
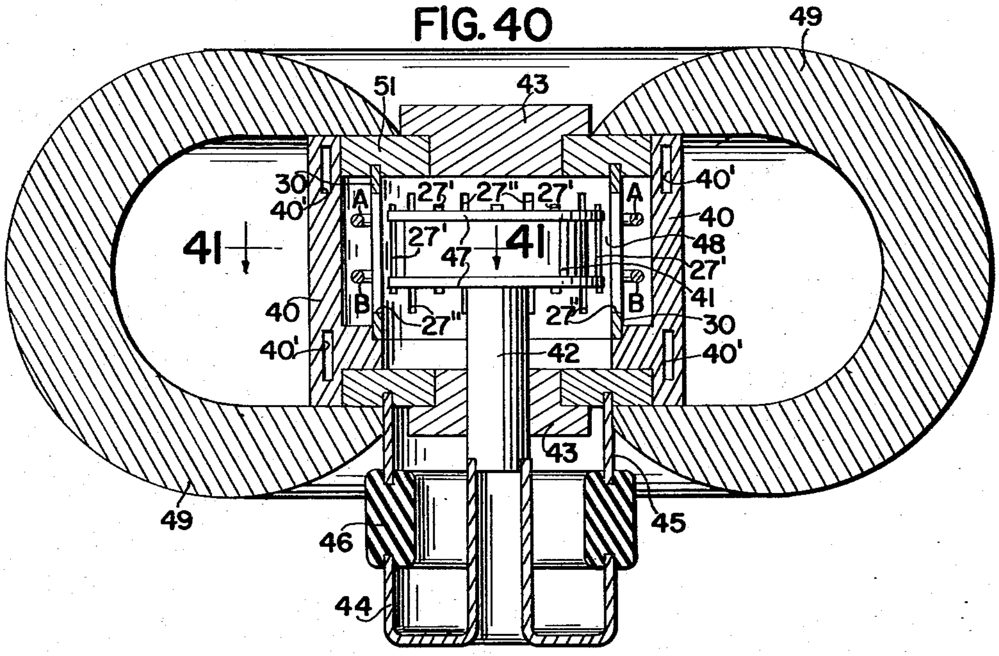
Figure 41:
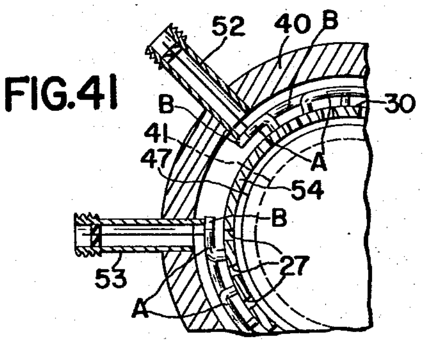

FIG. 3 is an equivalent circuit for a two wire line having low pass characteristics and showing sequential shunt type electronic interaction, FIG. 4(*a*) is a phasor diagram for the low pass circuit of FIG. 3 with the wave passing from left to right, FIG. 4(*b*) is a phasor diagram for the circuit of FIG. 3 with the wave passing from the right to left, FIG. 5 is a longitudinal schematic of a physical circuit equivalent to the circuit of FIG. 3, FIG. 6 is an $\omega-\beta$ diagram showing the dispersion characteristics for the circuit of FIG. 5, FIG. 7 is an equivalent circuit of a two wire transmission line at high frequency having low pass characteristics and depicting alternating shunt element type electronic interaction, FIG. 8 is a phasor diagram for the circuit of FIG. 7, FIG. 9 is a longitudinal section of a physical embodiment of the circuit of FIG. 7, FIG. 10 is an $\omega-\beta$ diagram for the circuit of FIG. 9, FIG. 11 is an equivalent circuit of a two wire transmission line at high frequencies, having low pass characteristics, and depicting alternating series and shunt type electronic interaction, FIG. 12 is a phasor diagram for the circuit of FIG. 11, FIG. 13 is a longitudinal section of an interdigital line equivalent to the circuits of FIGS. 11 and 15, FIG. 14 is an $\omega-\beta$ diagram depicting the dispersion characteristics for the circuit of FIG. 13, FIG. 15 is an equivalent circuit for a high pass two wire line depicting alternating series and shunt type electronic interaction, FIG. 16 is a phasor diagram for the circuit of FIG. 15, FIG. 17 is an $\omega$–$\beta$ diagram for the circuit of FIG. 15, FIG. 18 is an equivalent circuit for a band pass two wire line depicting alternating series and shunt type electronic interaction, FIG. 19 is a longitudinal sectional schematic drawing of a tube employing one embodiment of the slow wave circuit of the present invention, FIG. 20 is an enlarged fragmentary sectional view of the slow wave circuit of FIG. 19 taken along line 20—20 in the direction of the arrows, FIG. 21 is an $\omega$–$\beta$ diagram for the circuit of FIGS. 19 and 20, FIG. 22 is a perspective view showing alternative line support structures for the circuit of FIGS. 19 and 20, FIG. 23 is a perspective view of an interdigital slow wave circuit embodiment of the present invention, FIG. 24(*a*) is a transverse sectional view of the circuit of FIG. 23 depicting a preferred support structure, FIG. 24(*b*) is a reduced perspective view of an alternative structure to that of FIGS. 23 and 24 wherein the interdigitated fingers are of ring shape, FIG. 25 is an $\omega$–$\beta$ diagram for the circuit of FIGS. 23 and 24, FIG. 26 is a perspective view of an alternative slow wave circuit embodiment of the present invention, FIG. 27 is an enlarged transverse sectional view of the structure of FIG. 26 rotated 90°, FIG. 28 is a view of the structure of FIG. 27 along line 28—28 in the direction of the arrows, FIG. 29 is a view of the structure of FIG. 27 taken along line 29—29 in the direction of the arrows, FIG. 30 is an $\omega$–$\beta$ diagram for the slow wave circuit of FIGS. 26–29, FIG. 31 is a perspective view of a slow wave circuit embodiment of the present invention, FIG. 32 is a transverse sectional view of the structure of FIG. 31 taken along line 32—32 in the direction of the arrows, FIG. 33 is an $\omega$–$\beta$ diagram for the circuit of FIG. 31, FIG. 34 is a perspective view of an alternative embodiment of the slow wave circuit of the present invention, FIG. 35 is a transverse sectional view of the structure of FIG. 34 taken along line 35—35, FIG. 36 is an $\omega$–$\beta$ diagram for the circuit of FIGS. 34 and 35, FIG. 37 is a perspective view of a circuit equivalent to that of FIGS. 34–36 as wrapped around on itself for interaction with a cylindrical stream of charged particles, FIG. 38 is a perspective view of a circuit equivalent to that of FIG. 37 except that the slots are cut into a cylindrical tube from diametrically opposed sides, FIG. 39 is a longitudinal sectional view of a slow wave circuit embodiment of the present invention, FIG. 40 is a longitudinal sectional view of a crossed field amplifier tube embodying features of the present invention, and FIG. 41 is a transverse sectional view of a portion of the structure of FIG. 40 taken along line 41—41 in the direction of the arrows.

Figure 1:
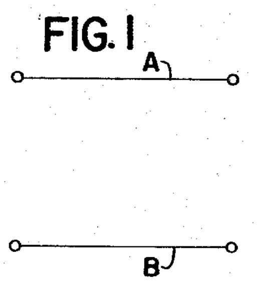
FIG. 1 is a longitudinal view of a two wire line.
Figure 2:
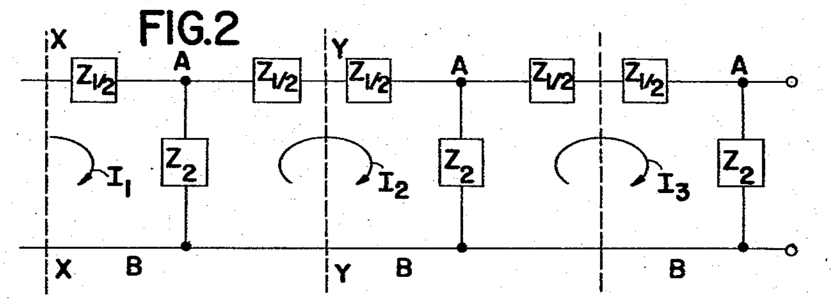
FIG. 2 is an equivalent circuit for a two wire line at high frequencies.

An equivalent circuit representation for a two wire transmission line of FIG. 1 having conductors A and B can be made at any single frequency by iterated sections of equivalent T filter circuit sections, as shown in FIG. 2. For a given mode of propagation at a given frequency, the fields at one cross section, such as *x—x* differ from those one period away, i.e., *y—y*, only by a complex constant.

The approach to be followed for analyzing these circuits takes the loop currents, $I_1$, $I_2$, . . . etc., as a reference point and the interaction voltages, $V_1$, $V_2$, . . . etc., are derived from these. It will be convenient to display the relative phases between them on phasor diagrams, such as FIG. 4(*a*). The value for the phase shift per section, $\theta$, between the reference loop currents in the equivalent circuit is given by $$\text{Cos}\ \theta = 1 + \frac{Z_1}{2Z_2} \qquad (1)$$

where $Z_1$ and $Z_2$ are the series and shunt impedances of the filter circuit. When the value for the lumped element parameters are not so readily assigned $\theta$ is found from $$\text{Cos}\ \theta = \text{Cos}\ \theta_0 - \frac{X}{2Z_0}\sin\theta_0 \qquad (2)$$

where $\theta$=phase shift per section of the loaded transmission line, $\theta_0$=phase shift per section of the unloaded transmission line, $X$=series loading impedance, and $Z_0$=surge impedance of the unloaded transmission line.

Electronic interaction is achieved by allowing the stream of charged particles, preferably electrons, to traverse the voltages developed across the series and/or shunt elements in a certain repetitive manner. For net synchronous interaction between a wave on the circuit and a stream of charged particles there should be a constant phase difference between successive voltages seen by the stream.

We consider first a two wire slow wave circuit made up of successive low pass filter sections, as shown in FIG. 3, with electronic interaction along a path shown by the dotted line. The electrons traverse voltages developed across the shunt elements 1 of the circuit but always cross the elements in the same direction relative to the two wires of the line. This is termed sequential shunt element interaction.

It will be useful for the understanding of these circuits to utilize the conventional graphical technique for displaying the instantaneous phase relationships between voltages and currents of the circuit and then to further interpret this so it can be used for understanding synchronous interaction with a traveling signal on the circuit. The diagram giving the instantaneous phase relationships between voltages and currents for a signal traveling from left to right is shown in FIG. 4(*a*). By convention the positive direction for phase angle measurement is counterclockwise. The instantaneous mangitudes of voltages and currents are measured from the projection of the respective phasors on the vertical axis as the phase diagram rotates in a counterclockwise direction. Rotation occurs with an angular velocity $\omega$ equal to that of the signal frequency on the slow wave circuit.

For the low pass filter with the signal traveling from left to right, the successive loop currents lag in phase by an angle $\theta$ as shown by $I_1$, $I_2$ and $I_3$. Values for $\theta$ fall between 0 and $\pi$ for low, high, and band pass filters and $\theta$ increases monotonically with frequency for a loss pass filter. The voltages for interaction are those developed across the capacitive reactances and lag behind the resultant driving currents by 90° as shown.

Synchronous interaction between the circuit wave and the electron stream will occur if the electrons move from one shunt voltage to the next in a time interval $\Delta t = \theta T/2\pi$ where $T = 1/f$. In this time, the voltage $V_2$ will advance in phase to that previously observed at $V_1$. Obviously any number of additional complete revolutions of the phase diagram can be added without altering the net result. This latter case corresponds to operation with a slower traveling wave and represents interaction with a higher order space harmonic.

Passive element networks are bilateral and signals can travel through them in either direction. The magnitude of the phase difference across the network will remain the same for each direction of travel but the algebraic sign will be reversed. Consider the circuit of FIG. 3 with the signal now traveling from right to left. The currents $I_2$ and $I_3$ now have a positive phase angle with respect to $I_1$ as shown in FIG. 4(*b*). The voltages $V_1$ and $V_2$ are obtained from the currents as before. The phase difference between the voltages is still $\theta$ but now voltage $V_2$ leads $V_1$. For synchronous interaction in this case, when an electron crosses voltage $V_1$ and travels to voltage $V_2$, it is necessary for a long period of time to elapse allowing the phase diagram to make a larger angular rotation; i.e., $\Delta t=(2\pi-\theta)T/2\pi$ with $0\leqq\theta\leqq\pi$. Again it is possible to allow additional integral multiples of rotation to be added without changing the net phase and corresponding to interaction with a higher order space harmonic.

The phase diagrams in FIGS. 4(*a*) and 4(*b*) must both rotate in a counterclockwise direction to show proper time dependence between voltages and currents from the projection of the phasors on the vertical axis. However, they correspond to different directions of signal travel through the network. It is possible to analyze the situation for synchrous interaction between interaction voltages by judicious interpretation of FIG. 4(*a*) alone. If the diagram is assumed to rotate clockwise with time, the proper relative phase relationships between voltages or currents are obtained for a signal traveling through the network of FIG. 3 from right to left. However, the orthogonal relationship between voltages and currents does not permit proper relative phase information between voltages and currents to be maintained. This is obvious by comparison of FIGS. 4(*a*) and 4(*b*). Nevertheless, for our purpose, the use of a single diagram is sufficient to determine which direction of rotation requires the smallest angular change for synchronous interaction. This direction corresponds to interaction with a wave or signal of the highest phase velocity, and it is customary to identify the basic characteristics of the circuit with that component.

A circuit is considered fundamentally forward wave if a counterclockwise motion of the phasors results in the smallest angle of rotation of the diagram for turning the successive voltage phasors into coincidence with the preceding one, and it is backward wave if the required motion is clockwise. The phasor diagrams are drawn assuming the signal is propagating from left to right and by utilizing a knowledge of low pass and high pass filter characteristics to assign the relative phases of the loop currents. For a low pass filter $\theta$ is negative. For a high pass filter $\theta$ is positive. For a band pass filter $\theta$ can be negative or positive depending upon whether at the operating frequency the filter is more nearly characterized by a low pass or high pass filter.

It is now clear by reference to FIG. 4(*a*) that synchronous interaction with sequential shunt element voltages of a low pass filter results in a circuit which is fundamentally forward wave. The exact shape of the individual dispersion curve for a practical circuit will depend upon the frequency dependence of $\theta$. At microwave frequencies it is difficult to obtain the equivalent of constant value lumped element parameters and values for $l$ and $c$ will themselves be frequency dependent. A typical dispersion curve would appear as shown in FIG. 6. In practice a lower limit to the pass band for a slow wave circuit occurs at a frequency greater than zero because of the frequency dependence of the parameters in the equivalent circuit. Phase velocity is taken as the reference for these circuits and the curves are plotted in the first quadrant. A forward wave circuit has both positive phase velocity ($v_p=\omega/\beta$) and group velocity ($v_g=d\omega/d\beta$) indicating both velocities move in the same direction through the filter. A typical example of a sequential shunt element slow wave circuit is the conventional bifilar helix as shown in FIG. 5.

Consider another possible path traveled by an electron stream which interacts with voltages developed across shunt elements of a low pass filter but which alternates the direction of traversal for each interaction. The path is shown in FIG. 7. This is termed alternating shunt element interaction.

The phase diagram for this siutation is shown in FIG.

8. The current phasors are again taken as the reference for a signal which is propagating from left to right in the filter. Successive currents lag in phase by an angle $\theta$. Location of the voltage phasors is established from the currents, as before, taking into account direction of current flow through the element. From the geometry of FIG. 8, it is seen that the voltage $V_2$ now leads $V_1$ by an angle $(\pi-\theta)$. The smallest angle of rotation for turning $V_2$ into coincidence with $V_1$ is clockwise, therefore alternating shunt element interaction with a low pass filter results in a fundamentally backward wave interaction. The electron will be synchronous with a voltage wave moving from left to right in the diagram but the energy on the circuit will be moving from right to left. A typical backward wave dispersion curve is shown in FIG. 10 with the phase velocity as a positive quantity and the slope of the curve (or group velocity) is negative. Again the exact shape of the dispersion curve depends upon the frequency dependence of $\theta$. A typical example of an alternating shunt element interaction slow wave circuit is the conventional interdigital line as shown in FIG. 9.

All of the interactions considered so far have been restricted to encounters with voltages across the shunt element of the equivalent circuit but not both the series and shunt elements. Both voltages are always present and it is of interest to consider an electron path that might utilize all voltages of the circuit. Such a path utilizing alternating series and shunt element interaction in a low pass filter is shown in FIG. 11. Note that the series inductances have been placed in conductor B in alternate filter sections. This is permissible since the equivalent circuit remains electrically the same. Successive loop currents lag each other in phase as before and the voltage phasors of the diagram of FIG. 12 are located again from the currents taking into account direction of flow through the element. For synchronous interaction the voltage phasors are equally displaced in phase increments. This can be checked from the diagram of FIG. 12. From geometry we recall that the diagonals of an equilateral parallelogram bisect the interior angles, therefore, the instantaneous phase of $(I_1-I_2)$ in the diagram is $(\pi-\theta)/2$. The instantaneous phase of voltage $V_2$ lags $(I_1-I_2)$ by $\pi/2$ so its phase is $$\frac{\pi-\theta}{2}-\frac{\pi}{2}=-\frac{\theta}{2}$$

It follows that the voltage $V_2$ lags $V_1$ by an angle $(\pi+\theta)/2$. The voltage $V_3$ lags current $I_2$ by $\pi/2$ so its phase is $-(\pi/2+\theta)$, and the voltage $V_2$ lags the voltage $V_2$ by an angle $$\left(\frac{\pi+\theta}{2}\right)$$

The phase difference between successive voltages are equal as desired. The smallest angle of rotation required for turning $V_2$ into coincidence with $V_1$ is counterclockwise so the circuit can be regarded as supporting a fundamentally forward wave interaction as shown in FIG. 14.

On the other hand, this circuit is more complex than those considered previously. Electronic interaction occurs with two different kinds of reactances so the circuit has a biperiodicity associated with it. Earlier it was stated that the fundamental characteristic of a circuit is conventionally associated with the mode with the highest phase velocity. The earlier circuits had a degree of symmetry which made the identification unambiguous. However in this case the biperiodicity allows the possibility for assigning a phase velocity based upon either a single or two element section. The latter choice might be more appropriate if either the series or shunt element voltage were small in magnitude compared to the other. For example, if the voltage $V_2$ in FIG. 12 were to be negligible in magnitude compared to $V_1$ and $V_3$, the circuit would more realistically be considered fundamentally backward wave and operation in this mode would have a phase velocity greater in magnitude that that for the previously assigned forward wave. However practical circuits employing alternating series and shunt element interaction do not have one voltage completely negligible in magnitude by comparison although they are different. In this case it is necessary to consider the result of attempted operation in the higher velocity, backward wave mode.

By reference to FIG. 12, the instantaneous phase of voltage $V_1$ is $\pi/2$. Voltage $V_2$ was shown to lag $V_1$ by an angle $(\pi+\theta)/2$ or in the diagram it has an instantaneous positive phase angle $(2\pi-\theta/2)$. Similarly voltage $V_3$ lags $V_2$ by an angle $(\pi+\theta)/2$, or it has an instantaneous positive angle $(3\pi/2-\theta)$. The angle between $V_3$ and $V_1$ is $(\pi-\theta)$. During operation in the higher velocity backward wave mode, an electron must move from the element with voltage $V_1$ to the element with voltage $V_3$ during a time interval $\Delta t=(\pi-\theta)T/2\pi$; i.e. during the time the voltage phasor $V_3$ moves clockwise into the position of $V_1$. The circuit elements, of course, would be spaced equidistantly along the electron path and in half this interval of time the electron would be crossing the element with voltage $V_2$. During this time interval the voltage phasor $V_2$ would have moved clockwise with an angular change $(\pi-\theta)/2$ to an instantaneous positive angle position $3\pi/2$. Proper synchronous interaction would require a voltage phase angle equal to that of $V_3$ at this point or $(3\pi/2-\theta)-(\pi-\theta)/2=\pi-\theta/2$. The phase angle difference between the desired phase and the encountered phase is $3\pi/2-(\pi-\theta/2)=(\pi+\theta)/2$. In other words, as the phase angle varies from $\theta$ to $\pi$ across a two element cell, the phase of the voltage across the intermediate element will never be optimum for synchronous interaction with the faster wave. It will vary from the optimum value from phase quadrature to completely out of phase. The result of this would be to decrease the interaction impedance for this mode of operation. Therefore, alternating series and shunt element interaction with a low pass filter reduces the interaction impedance of what might be regarded as a fundamental backward wave mode of operation and increases the impedance of the fundamental forward wave mode. FIG. 13 is a typical example of alternating series and shunt element interaction slow wave circuit as derived from a two wire line. The circuit can be described as an indigital line having bifurcated interdigitated conductive fingers, the bifurcated portion of the fingers providing the series inductive element 2. The circuit will be more fully described below.

The range of the phase shift per section is of particular interest for the alternating series and shunt element interaction circuit. The phase shift $\theta$ across a total section of a low pass or high pass filter covers the range between zero and $\pi$ radians but the phase shift 4 between the individual elements (see FIG. 12) covers only the range between $\pi/2$ and $\pi$. This has the effect of increasing the usable bandwidth for electronic interaction particularly in emitting sole crossed-field tubes. See FIG. 14. For these tubes the variation in voltage, impedance and locking power with phase shift per section generally restricts use to that portion of the band where $\theta$ is above $\pi/2$ and less than $\pi$. This is usually much less than half the passband of the circuit. This new class of circuit, however, enables one to use nearly the whole passband of the circuit thereby doubling the electronic bandwidth.

Alternating series and shunt type electronic interaction can also be obtained from a two wire line having high pass characteristics. The equivalent circuit for such a device is shown in FIG. 15. The line contains successive T filter sections having series capacitive elements 3 and shunting inductive elements 4. The electron path is shown by the dotted line. For a high pass filter successive loop currents I, $I_2$ and $I_3$ lead by the angle $\theta$ as shown in FIG. 16. $V_2$ leads $V_1$ and therefore the circuit is best described as a fundamental backward wave circuit. The $\omega$–$\beta$ diagram for the circuit of FIG. 15 is shown in FIG. 17 and as previously described, with regard to the low pass alternate series and shunt interaction circuit, the electronic bandwidth of the circuit is substantially increased for crossed field devices because the phase shift $\phi$ between individual elements covers only the range between $\pi/2$ and $\pi$.

Alternate series and shunt electronic interaction is used particularly well when the series and shunt elements are tuned circuits as shown in FIG. 18. The reactance of a parallel tuned circuit is inductive below its resonant frequency and capacitive above. Since the sign of the reactances for the series and shunt elements must be opposite in the passband, the tuned circuits must be resonant at different frequencies. The passband lies between these frequencies but does not occupy the whole range. This will be discussed later. The resultant circuit permits forward wave or backward wave electronic interaction dependent upon whether the resonant frequency of the series element is above or below, respectively, that of the shunt element. When the series element is resonant at the higher frequency, the passband filter exhibits normal dispersion ($\theta$ increase monotonically with frequency) and successive voltages encountered by the electrons are properly phased for forward wave interaction. The converse is true when the series element is resonant a the lower frequency. By using a passband filter in this manner it is possible, by judicious choice of $\omega_1$ and $\omega_2$, to obtain a broad band constant velocity circuit. Specific examples of alternate series and shunt electronic interaction slow wave circuits are described below.

Referring now to FIGS. 19 and 20 there is shown a specific example of an alternate series and shunt interaction slow wave circuit. The circuit includes a pair of conductors A and B axially spaced apart in the direction of the stream of charged particles to form a two wire transmission line. The transmission line is meandered back and forth across the stream path. An electron gun 5 is provided at one end of the circuit for projecting a stream of electrons adjacent and over the slow wave circuit to an electron collector electrode 6 disposed at the terminal end of the stream for collecting the stream particles. A vacuum envelope, partially shown at 7 surrounds and envelops the aforementioned tube elements. The envelope is evacuated to a suitably low pressure as of $10^{-9}$ mm. Hg and includes suitable feed through insulative fittings 8 for applying and extracting operating potentials and signals to the tube elements in use.

In use, signals to be amplified are applied to the circuit via input terminal 9 and amplified signals extracted from output terminal 11. Shunt voltages exist between conductors A and B and the series voltages exist in the loops of each of the wires A and B. It can be seen that a particle in the beam traveling from the gun 5 to the collector 6 sees a succession of alternating series and shunt voltages on the meandered two wire line.

The $\omega$–$\beta$ diagram for the circuit of FIGS. 19 and 20 is shown at FIG. 21, see the dotted line, and corresponds to low pass forward wave electronic interaction having improved impedance and electronic bandwidth.

The circuit of FIGS. 19 and 20 is conveniently supported by quarter wave choke conductive stubs 12 interconnecting the conductors A and B with the envelope. This type of support also enhances cooling of the circuit by thermal conduction to the envelope 7. The quarter wave stubs 12 provide a high impedance at the circuit to prevent substantial electrical interference therewith over the operating frequency band.

As an alternative support structure for the circuit of FIGS. 19 and 20 ceramic stubs 13 may be used. The ceramic stubs provide less cooling but also are less disruptive of the electrical transmission properties of the circuit. The ceramic support stubs may also support the circuit by interconnecting the envelope and circuit in a plane normal to the plane of the circuit as shown in FIG. 22.

Additional cooling for the circuit is obtained by forming the conductors A and B, stubs 12 and envelope 7 of hollow tubing and causing a coolant to flow therethrough. The conductive stub supports 12, when used, determine the low frequency cut off $\omega_1$ of the circuit, see the solid line of FIG. 21. At frequencies substantially below the quarter wave length frequency of the stubs 12 they begin to short out the circuit to the envelope 7.

The high frequency end of the passband, $\omega_2$, of the circuit of FIGS. 19 and 20 is determined by the path length $l_1$ taken along the meandering line inbetween successive interaction regions of like kind, see FIG. 20. When $l_1$ is equal to half a waveguide wavelength $\lambda\alpha/2$, corresponding to $\pi$ phase shift per filter section, the circuit has reached its high frequency cut off $\omega_2$.

Referring now to FIG. 23 there is shown another embodiment of the present invention. In this embodiment a two wire derived transmission line comprised of condductors A and B is provided with interdigitated bifurcated fingers 15 to form a structure like two interdigitated combs, the teeth of the combs being bifurcated. The circuit provides alternate series and shunt electronic interaction as previously pointed out with regard to FIG. 13. The space between the bifurcated fingers which are rooted in the same conductor forms the series reactive element and provides the series interaction voltage whereas the region between adjacent fingers 15 which are rooted in different conductors provides the shunt interaction voltage. As with the circuit of FIGS. 19 and 20 the high frequency cut off is determined by the path length $l_1$ taken along the transmission path, see FIG. 13. Only in this case the path length $l_1$ must take into account the effect of the reactive loading region of the bifurcated fingers. Equation 2 is useful for calculating the phase shift $\theta$ along path $l_1$ between filter sections. The criterion is that the high frequency cut off, $\omega_2$, occurs when the phase shift taken along path $l_1$ is $\pi$ radians. The low frequency cut off for the circuit of FIG. 23 is D.C. when conductors A and B are electrically insulated from each other. The circuit of FIG. 23 is characterized as a low pass fundamental forward wave interaction circuit with the phase shift per element lying in the range $\pi/2$ to $\pi$ radians as shown in the $\omega$–$\beta$ diagram of FIG. 25 by the solid line. This circuit has extremely broad band operation and has given amplification over an octave of bandwidth at 1 to 2 gc.

FIG. 24($a$) shows the interdigital line structure of FIG. 23 with an alternative support. In this case the two wire interdigitated line is supported from a conductive wall 16 as, for example, the envelope of the tube via the intermediary of a pair of conductive arms 17. The arms destroy the D.C. isolation between the conductors A and B of the circuit of FIG. 23 and therefore raise the lower cut off frequency from D.C. to some finite frequency, $\omega_1$, as indicated by the dotted line of FIG. 25. The length of the support arms, S, serves as an adjustment for the low frequency cut off $\omega_1$. The arms 17 enhance cooling of the circuit by forming thermal conducting paths to the wall 16.

The conductive fingers 15 may be provided with aligned openings 18 to pass the electron stream therethrough or the electron beam in sheet or cylindrical form may be passed adjacent the circuit as indicated in FIG. 24($a$).

An alternative embodiment to the apertured conductive fingers of the circuit of FIG. 24(a) is shown in FIG. 24($b$). In this embodiment the conductive fingers 15′ have been formed in ring shape to enhance the electronic interaction between the fields of the circuit and a cylindrical beam projected coaxially thereof. The circuit of FIG. 24($b$) may also be supported from a conductive back wall 16 via arms 17 in the manner as shown in FIG. 24($a$). In the latter case the support wall 16 would preferably by cylindrical and coaxial of the circuit surrounding same and serving as the vacuum envelope.

Referring now to FIGS. 26–29 there is shown an alternative embodiment of the present invention. More particularly, the bifurcated interdigital line of FIGS. 23 and 24($b$) is choke supported from a back wall conductive member 19 via the intermediary of a plurality of choke stub members 21. The back wall 19 serves as a heat sink for cooling of the interdigitated conductive fingers 15. As in FIGS. 23, 24($a$) and 24($b$) the electrical length $l_1$ as effected by the reactive loading due to the depth $d$ of the series slot determines the high frequency cut off, $\omega_2$, for the circuit. The low frequency cut off, $\omega_1$, is determined by the choke support dimensions $a$ and $b$, respectively. The longer the length, $a$, of the choke member 21 the lower the low frequency cut off $\omega_1$. So, too, the smaller the height, $b$, of the choke member 21 the lower the low cut off frequency $\omega_1$. Thus, as in FIGS. 23–24($b$) the circuit of FIGS. 26–29 is characterized by a forward wave fundamental alternate series and shunt electronic interaction. The stub supported interdigital line circuit of FIGS. 26–29 forms the subject matter of and is claimed in co-pending U.S. application 350,516 filed Mar. 9, 1964, and assigned to the same assignee as the present invention.

Referring now to FIGS. 31 and 32 there is shown another embodiment of the present invention. In this embodiment an alternating series and shunt electronic interaction circuit is formed by an array of parallel spaced bar members 25 strapped together by a pair of conductors A and B to form a two wire derived slow wave circuit. Each bar 25 is shorted to its adjacent bar 25 via a pair of shorting bars 26 to define a slot region 27 in the space enclosed by the shorted bars 25. The shorting bars 26 are arranged in a step like fashion to define an array of alternate long and short slots 27″ and 27′, repsectively. The slots 27′ and 27″ are resonant at different frequencies. In the circuit as shown in FIG. 31 the short slots 27′ are connected in series with the two wires A and B whereas the long slots 27″ are connected in shunt between conductors A and B. The short slots 27′ have a higher resonant frequency than the long slots 27″ and the equivalent circuit for the structure of FIG. 31 is shown in FIG. 18 where $\omega_1 > \omega_2$. This corresponds to a band pass fundamental space harmonic forward wave circuit having a dispersion curve as shown by the solid line of FIG. 33. The circuit of FIG. 31 may be made to have a fundamental backward wave space harmonic over its first passband as shown by the dotted line of FIG. 33, by making the series slots 27′ longer than the shunt slots 27″. This is accomplished by moving the shorting bars 26 to the positions as indicated by the phantom lines of FIG. 31. The backward wave fundamental circuit of FIG. 31 is especially useful because of its wide electronic tuning bandwidth and may be used to advantage in backward wave oscillators or amplifiers. The fields of the circuit interact with the steam of charged particles projected over the array of bars 25 in a direction generally parallel to the parallel conductors A and B as indicated by line 29 and as shown in FIG. 32. The circuit may be used in linear form as shown in FIG. 31 or the circuit may be arcuate as used in crossed field magnetron type tubes. Signals to be applied to or extracted from the circuit are connected across terminals A and B. The bars 25 and 26 as well as the conductors A and B may be hollow tubes for passage of a suitable coolant therethrough for cooling of the circuit in use.

Referring now to FIGS. 34–36 there is shown a circuit substantially equivalent to that of FIGS. 31–33 except that the resonant slots 27 of the array are formed in a conductive wall 30 instead of being defined by shorted bar members 25. As with the circuit of FIGS. 31–34 the circuit shown provides a fundamental forward space harmonic electronic interaction because the series slot 27′ have a higher resonant frequency than the shunt slots 27″ as shown in the solid line of FIG. 36. The circuit has a fundamental backward wave space harmonic electronic interaction when slots 27′ are longer than slots 27″ as shown by the dotted line of FIG. 36.

In a typical example of a circuit of FIGS. 34 and 35 one hundred slots 27 were arranged in a circular array coaxial with a cathode as shown in FIGS. 40 and 41. The long slots 27'' were 1.5'' long, 0.050'' wide, and 0.050'' deep. The short slots, forming the series reactive elements, were 1.0'' long, 0.050'' wide and 0.050'' deep. The width of the copper conductor portion between adjacent slots 27 was 0.050''. The circuit is designed to provide 20 db gain over a passband of 3,500–5,500 mc. with a synchronous beam voltage of 3 kv. The circuit is capable of dissipating 100 watts CW without cooling and with cooling will dissipate 2 kw.

Referring now to FIG. 37 there is shown an alternative embodiment of the structure of FIGS. 34–36. In this embodiment the conductive wall 30 is formed into a hollow cylinder or tube 31 with the slots 27 cut into the cylinder from one side. The unslotted portion of the tube 31, that is, the wall portion between the ends of the slots 27 forms a heat sink which may be mounted to a supporting conducting wall 32, as shown, for carrying away excess heat. Parallel conductors A and B strap the slotted structure together as described above with regard to FIGS. 34 and 35. The tubular slotted structure of FIG. 37 is especially useful for interaction with a cylindrical beam of charged particles projected coaxially thereof adjacent the structure. Therefore this circuit is especially adapted for traveling wave amplifiers and oscillators and as a beam coupler for klystron or hybrid linear beam tubes.

Referring now to FIG. 38 there is shown another alternative structure to that of FIG. 37. In this embodiment adjacent slots 27 are cut into the tube 31 from opposite sides of the tube. Electrically the circuit is same as that of FIGS. 34–37. The parallel conductors A and B which serve to strap the slotted tube 31 are preferably diametrically disposed on the tube as shown in FIG. 38. The circuit may be operated in the forward or backward fundamental space harmonic mode by suitably arranging the connecting points of the parallel strapping conductors A and B to the circuit as above described.

Referring now to FIG. 39 there is shown another embodiment of the present invention. In this embodiment alternate series and shunt electronic interaction is obtained by causing the beam to meander back and forth across a series reactively loaded two wire transmission line. More specifically, a strip line is formed by a pair of conductors A and B. Each of the strip conductors A and B is provided with inductive reactive loading sections 35. The circuit therefore has a low pass transmission characteristic. A beam of electrons is caused to meander or undulate back and forth across the circuit or mean direction of the beam as indicated at line 37 as shown by the dotted line 36. In this manner the electrons "see" alternate series and shunt voltages of the circuit. The circuit has a typical forward wave fundamental space harmonic mode as shown in FIG. 21. Magnetic deflection focusing of the beam is taught in U.S. Patent No. 3,013,173 issued Dec. 12, 1961, and may be used to focus the beam into the meandering or undulating path 36.

Referring now to FIGS. 40 and 41 there is shown a typical example of a crossed field tube of the circular or magnetron type employing the novel alternate series and shunt slow wave circuit of the present invention. A cylindrical anode block 40 as of copper forms the vacuum envelope of the main tube body portion containing the tube elements including circuit plate 30 which has been formed into a cylinder.

A continuous cylindrical cathode 41, preferably a cold cathode made of a low work function material such as beryllium-copper, is supported coaxially within the tube body by means of a stem 42 extending through the lower of a pair of header members 43 to mate with an annular cathode connector 44 which is separated from anode connector 45 by means of an insulating ring 46. The cathode 41 is bounded by a pair of end hats 47 which confine the emitted electrons to the interaction region 48 between the cathode 41 and the circuit plate 30. A vertically directed magnetic field is provided in this interaction region by means of a permanent magnet 49 communicating with opposed annular pole pieces 51 which are secured in a vacuum sealing manner, as by brazing, between anode block 40 and headers 43. The crossed electric field in the region 48 is provided by means of a negative voltage applied between anode connector 45 and cathode connector 44.

In operation, a signal which it is desired to amplify is fed to one of the parallel conductors A or B of the circuit plate 30 via input coaxial connector 52 and establishes a traveling wave in the interaction region 48. The injection of this wave will be sufficient to initiate the emission of electrons in the case of a cold cathode 41, and this emission will remain continuous, without the necessity of supplying external heating power, by secondary emission due to back bombarding electrons which have gained energy from the wave. The interacting electron stream moves through the region 48 with a clockwise circumferential velocity determined by the ratio of electric to magnetic field. The phase velocity of the traveling wave is approximately synchronous with this stream velocity for a wide band of frequencies so that the electrons deliver energy to and amplify waves within this band, the amplified output signal being led out via output coaxial connector 53. The slow wave circuit is interrupted between the input and output connectors 52 and 53 to provide a drift segment 54 of sufficient length to permit electron debunching so that the electrons may re-enter the interaction region for improved efficiency without producing undesired internal feedback. The heat generated in the circuit structure 30 flows through conductor portions 30 and is dissipated in the anode block 40 which is fluid cooled through channels 40'.

It should be noted that whereas the slow wave structures in accordance with the present invention are useful with various types of traveling wave tubes, they are particularly useful in crossed-field or M-type tubes where an extensive interaction region is required, and also where the larger interception of electron current and the close spacing of sections required for operation at the lower electron velocities of these tubes intensify the problems of construction and heat dissipation. Such cross-field tubes include versions wherein the interaction region is colinear and also injected beam versions (both colinear and reentrant) in which the emitting cathode is outside of the interaction region.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high frequency tube apparatus including: means forming a slow wave circuit characteristic of a two conductor transmission line, means forming a stream of charged particles adjacent said slow wave circuit for electronic interaction therewith, iterative means in said slow wave circuit for developing a succession of voltages in series with said conductors of said slow wave circuit, iterative means in said slow wave circuit for developing a succession of voltages in shunt with said conductors of said slow wave circuit, and means for causing the particles of said stream to alternately interact with electric fields in the direction of the stream developed by said series and shunt voltages according to the sequence, shunt-series-shunt-series . . . etc., to produce a cumulative net electronic interaction between a wave traveling on said slow wave circuit and said stream of charged particles whereby enhanced electronic interaction is obtained.

2. The apparatus according to claim 1 wherein the phase shift between said series and shunt voltages lies within the range of $\pi/2$ to $\pi$ radiants for the fundamental space harmonic mode whereby the electronic bandwidth of the tube is enhanced.

3. The apparatus according to claim 1 wherein said slow wave circuit is formed by a parallel line meandered back and forth transverse to the stream of charged particles, said circuit having a line of development along the direction of said stream of particles, said shunt voltages appearing between the two conductors of said parallel line, and said series voltages appearing between adjacent portions of the same conductors.

4. The apparatus according to claim 1 wherein said slow wave circuit is formed by an interdigital line having interdigitated conductive finger portions, said interdigitated finger portions being bifurcated to provide said means for developing said succession of series voltages.

5. The apparatus according to claim 4 wherein said interdigitated finger portions are apertured in axial alignment for passage of said stream of charged particles therethrough.

6. The apparatus according to claim 5 wherein said interdigitated finger portions are ring-shaped to enhance electronic interaction with a cylindrical stream of particles.

7. The apparatus according to claim 4 including a conductive wall spaced from said slow wave circuit, and a pair of conductive arm members interconnecting said interdigital line and said wall for enhancing the conduction of heat from said interdigital line to said wall to cool said line in use.

8. The apparatus according to claim 1 wherein said slow wave circuit includes an array of spaced apart resonant structures, adjacent resonant structures having different resonant frequencies and every other one of the resonant structures having a resonant frequency lower than the resonant frequency of the intermediate resonant structures such that the resonant frequencies of the resonators making up said array alternate between an upper frequency and a lower frequency, alternate ones of said resonant structures developing the succession of series voltages, and the other resonant structures developing the succession of shunt voltages.

9. The apparatus according to claim 8 wherein said array of resonant structures is formed by an array of resonant slots defined by the space enclosed by bordering conductive bars.

10. The apparatus according to claim 8 wherein said array of resonant structures is formed by an array of resonant slots formed in a conductive wall.

11. The apparatus according to claim 8 wherein said array of resonant structures is formed by an array of alternate long and short slots disposed transverse to said stream of particles and thereby forming two sets of slots including a pair of spaced conductors directed along the stream path, and means for interconnecting said slots to said pair of conductors to connect one set of like slots in series with said conductors and to connect the other set of like slots in shunt with said conductors.

12. The apparatus according to claim 11 wherein said set of short slots are connected in series with said conductors and said set of long slots are connected in shunt with said conductors to provide said slow wave circuit with a fundamental forward wave space harmonic mode for electronic interaction with said stream.

13. The apparatus according to claim 11 wherein said set of long slots are connected in series with said conductors and said set of short slots are connected in shunt with said conductors to provide said slow wave circuit with a fundamental backward wave space harmonic mode for electronic interaction with said stream.

14. The apparatus according to claim 11 wherein said slots are formed in a tubular conductive member with the axes of said slots being generally in alignment with the longitudinal axis of said tubular member to enhance electronic interaction with a cylindrical stream projected circumferally of said tubular member.

15. The apparatus according to claim 11 wherein said slots are formed in a tubular conductive member with the axes of said slots being generally directed transversely to the longitudinall axis of said tubular member to enhance electronic interaction with a cylindrical stream projected coaxially of said tubular member.

16. The apparatus according to claim 15 wherein said slots are formed in said tubular member by partially cutting through said tube substantially only from one side of said tube to form a heat sink of the unslotted portion of said tubular member.

17. The apparatus according to claim 15 wherein said slots are formed in said tubular member by partially cutting through said tube from opposite sides of said tube, said short slots being cut in from one side and said long slots being cut in from the other side.

18. The apparatus according to claim 1 wherein said slow wave circuit is formed by a pair of generally parallel directed spaced apart mutually opposed conductors, each of said conductors having iterative longitudinally spaced successive inductive loading sections connected in series with said conductors, said inductive loading sections of one conductor being longitudinally intermediately spaced to those of said other conductor, and means for meandering said stream of charged particles back and forth across said two conductors and series inductive loading sections such that said charged particles alternately interact with the voltages of said series loading sections and the voltages between said pair conductors.

References Cited

UNITED STATES PATENTS

| | | | |
|---|---|---|---|
| 2,679,615 | 5/1954 | Bowie | 315—39.7.3 |
| 2,881,348 | 4/1959 | Palluel | 315—3.6 |
| 2,888,595 | 5/1959 | Warmecke et al. | 315—3.5 |

HERMAN KARL SAALBACH, *Primary Examiner.*

S. CHATMON, Jr., *Assistant Examiner.*